United States Patent
Harada et al.

(10) Patent No.: US 7,381,389 B2
(45) Date of Patent: Jun. 3, 2008

(54) WET GAS PURIFICATION METHOD AND SYSTEM FOR PRACTICING THE SAME

(75) Inventors: Masahiro Harada, Minato-ku (JP); Shintaro Honjo, Hiroshima (JP); Makoto Susaki, Minato-ku (JP); Kazuo Ishida, Minato-ku (JP); Hajime Nagano, Minato-ku (JP); Susumu Okino, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 363 days.

(21) Appl. No.: 10/523,679

(22) PCT Filed: Aug. 6, 2003

(86) PCT No.: PCT/JP03/09985

§ 371 (c)(1),
(2), (4) Date: Sep. 2, 2005

(87) PCT Pub. No.: WO2004/016717

PCT Pub. Date: Feb. 26, 2004

(65) Prior Publication Data

US 2006/0110304 A1    May 25, 2006

(30) Foreign Application Priority Data

Aug. 6, 2002  (JP) .............................. 2002-228308

(51) Int. Cl.
*B01D 53/58*    (2006.01)
*B01J 10/00*    (2006.01)

(52) U.S. Cl. ...................... 423/237; 423/238; 422/129; 422/168; 422/187

(58) Field of Classification Search ................ 423/237, 423/238; 422/129, 168, 187
See application file for complete search history.

(56) References Cited

U.S. PATENT DOCUMENTS

| 2,954,272 | A | * | 9/1960 | Schaufelberger ............. 423/352 |
| 4,032,618 | A | * | 6/1977 | Matthews .................... 423/351 |
| 4,088,735 | A | * | 5/1978 | Bratzler et al. ............. 423/219 |
| 4,329,320 | A | * | 5/1982 | Vydra et al. .................... 423/1 |
| 5,112,586 | A | * | 5/1992 | Baker .......................... 423/220 |
| 6,183,720 | B1 | * | 2/2001 | Laederich et al. ....... 423/658.5 |

FOREIGN PATENT DOCUMENTS

| GB | 1318731 | 5/1973 |
| JP | 53-205 | 1/1978 |
| JP | 54-107904 | 8/1979 |
| JP | 8-281251 | 10/1996 |
| JP | 10-60449 | 3/1998 |

(Continued)

*Primary Examiner*—Timothy C Vanoy
(74) *Attorney, Agent, or Firm*—Wenderoth, Lind & Ponack, L.L.P.

(57) ABSTRACT

A wet gas purification method is provided for removing ammonia from a heavy oil gasification gas, such as coal. The method principally involves a washing step during which absorbent is charged into the gas to absorb ammonia and an ammonia treating step wherein absorbent discharged from the washing step is separated into an effluent and an off-gas containing ammonia. The amount of absorbent charged during the washing step is controlled such that the ammonia concentration of gas exiting the washing step is 10 ppm or less.

6 Claims, 3 Drawing Sheets

FOREIGN PATENT DOCUMENTS

| | | |
|---|---|---|
| JP | 11-57397 | 3/1999 |
| JP | 2000-104079 | 4/2000 |
| JP | 2000-248286 | 9/2000 |
| JP | 2000-290668 | 10/2000 |
| JP | 2001-81479 | 3/2001 |
| JP | 2001-123184 | 5/2001 |
| JP | 2001-214164 | 8/2001 |

* cited by examiner

WET GAS PURIFICATION METHOD AND SYSTEM FOR PRACTICING THE SAME

BACKGROUND OF THE INVENTION

The present invention relates to a wet gas purification method for removing ammonia from a gas. More particularly, the present invention relates to a wet gas purification method and a wet gas purification system suitable for removing ammonia from a gas such as a coal or heavy oil gasification gas.

Conventionally, in a wet purification system for a coal or heavy oil gasification gas, sulfuric acid is added upstream of a hydrogen sulfide ($H_2S$) absorption tower as a pH adjuster. This allows for the removal of ammonia ($NH_3$), which is a source of fuel NOx in gas turbines, during the water-washing step for removing impurities in the gas.

Specifically, if a gas containing ammonia is burned in a gas turbine without being purified, the gas becomes a NOx source, so that it is necessary to recover as much ammonia as possible. To absorb the ammonia, a method for decreasing the pH of an absorbent in a water-washing tower is carried out, by which most of the ammonia can be removed. As a pH adjuster, sulfuric acid is preferably used in adjusting alkali of ammonia. The pH of the water-washing tower can be reduced by the addition of the sulfuric acid.

The ammonia removed in the above-described water-washing step is taken out by an ammonia stripper. Since sulfuric acid is added to the absorbent, ammonium sulfate exists in the discharged solution from the ammonia stripper. The ammonia is recovered as aqueous ammonium sulfate.

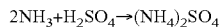

$$2NH_3 + H_2SO_4 \rightarrow (NH_4)_2SO_4$$

To expel ammonia components from the aqueous ammonium sulfate and to recover ammonia as aqueous ammonia by a stripping method, caustic soda (NaOH) is added before the stripping. Usually, the caustic soda is charged into a neutralization tank provided upstream of the stripper and is mixed. Then, the mixed liquid is sent to the stripper. The addition of NaOH yields sulfuric acid and ammonia again as described in the following formula. Then ammonia is recovered.

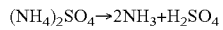

$$(NH_4)_2SO_4 \rightarrow 2NH_3 + H_2SO_4$$

On the other hand, in the above-described conventional system, one of major reasons for adding sulfuric acid is to facilitate the operation control of the system. That is to say, if the pH value of the liquid is decreased by sulfuric acid, ammonia can be recovered and removed. There is no need for monitoring and controlling the amount of ammonia at the following step of the water-washing step, and the control of pH suffices for operation. Because of such ease of operation, a method in which sulfuric acid is added has been used.

Also, by decreasing the pH value, hydrogen sulfide is not removed in the water-washing step, but passes through easily. A higher pH value presents a disadvantage of dissolution of hydrogen sulfide in the liquid, making the treatment of effluents complicated. Specifically, the conventional practice involves changing the pH value between the separation/removal step of ammonia and the removal step of hydrogen sulfide so that in the ammonia separation step, hydrogen sulfide does not dissolve in the liquid, and is not removed from the gas.

Moreover, the conventional practice requires the addition of sulfuric acid and caustic soda, which are costly. For example, to treat 1000 ppm of ammonia existing in the gas, ½ mole of sulfuric acid is needed for every 1 mole of ammonia, which increases the chemical cost. Also, in order to treat the nitrogen components in the effluent from a water-washing tower, which contains absorbed ammonia, at least 2 moles of caustic soda (NaOH) are required per 1 mole of sulfuric acid. Further, an amount of caustic soda equivalent to the amount of ammonia is needed. Therefore, the chemical expense is great. Thus, while the ammonia can be recovered, the after-treatment steps are complicated and increase in number.

Further, since the recovered aqueous ammonia accounts for about 20 percent by weight, there is no other choice but to treat it as waste, which poses a problem of treatment cost.

SUMMARY OF THE INVENTION

In view of the above problems, the inventors carried out studies to develop a method for purifying an ammonia-containing gas in which chemicals such as sulfuric acid and caustic soda, which have been regarded as necessary, are not used thereby significantly reducing operation cost and effectively restraining emissions. Furthermore, the steps and system are simple, operation is easy, and reliability is high.

As a result, the inventors arrived at the present invention through their discovery that the above problems can be solved by continuously measuring the concentration of ammonia in the gas after the washing step, and controlling the charging makeup water in the washing step, rather than adding sulfuric acid to reduce the ammonia concentration to 10 ppm or lower.

Specifically, the present invention provides a wet gas purification method for removing ammonia in the gas comprising: a water-washing step for absorbing ammonia in the gas into absorbent to remove the ammonia; and an ammonia treating step for stripping the ammonia from the absorbent to be discharged after the water-washing step to separate an off-gas containing ammonia from effluents, wherein, makeup water is charged continuously or intermittently in the water-washing step so that the concentration of the ammonia is 10 ppm or lower after the water-washing step. The washing step may comprise a cooling step and a cleaning step. That is to say, the partial pressure of $NH_3$ can be decreased by decreasing the concentration of ammonia in aqueous solution, rather than by actively controlling the pH value, to keep the $NH_3$ absorbing performance.

In the present invention, it is preferable that the method further comprises a step for burning the off-gas. By this off-gas burning step, hydrogen sulfide dissolved in the water-washing step can also be decomposed simultaneously with the decomposition of ammonia.

Further, in the present invention, it is preferable that effluents in the ammonia treating step be circulated charged to the washing step as makeup water.

In the present invention, even if hydrogen sulfide is dissolved in the absorbent, it can be separated to be removed from the liquid by a stripper, so that there is no need for treating hydrogen sulfide in the liquid. The off-gas containing ammonia and hydrogen sulfide can be treated by being burned in the combustion furnace at a following step. It is efficient for the total system to burn the off-gas using a regenerative combustion furnace or a direct burning combustion furnace for burning the off-gas coming out of a hydrogen sulfide absorbing step. According to the present invention, charging only makeup water can make ammonia stripping easy. Further, the discharged substance can be easily used for combustion treatment.

According to the present invention, since only makeup water is charged, and neither sulfuric acid nor caustic soda is used, the cost required for operation can be reduced significantly, and also the manipulation step can be made simple and easy.

Since the makeup water is added, ammonia can exist in the form of ammonium carbonate $(NH_4)_2CO_3$ by the action of existing carbon dioxide. When the accumulated $(NH_4)_2CO_3$ is heated and the temperature rises, the $(NH_4)_2CO_3$ can release carbon dioxide to yield ammonia again. By stripping ammonia $NH_3$ and carbon dioxide $(CO_2)$ without using NaOH in this manner, the cost required for operation can be reduced. Also, by burning $H_2S$ and $NH_3$ in the effluent stripping gas, the cost for treating aqueous ammonia can be eliminated.

The present invention is explained in detail below with reference to an embodiment. The scope of the present invention is not limited by this embodiment.

Figure 1:
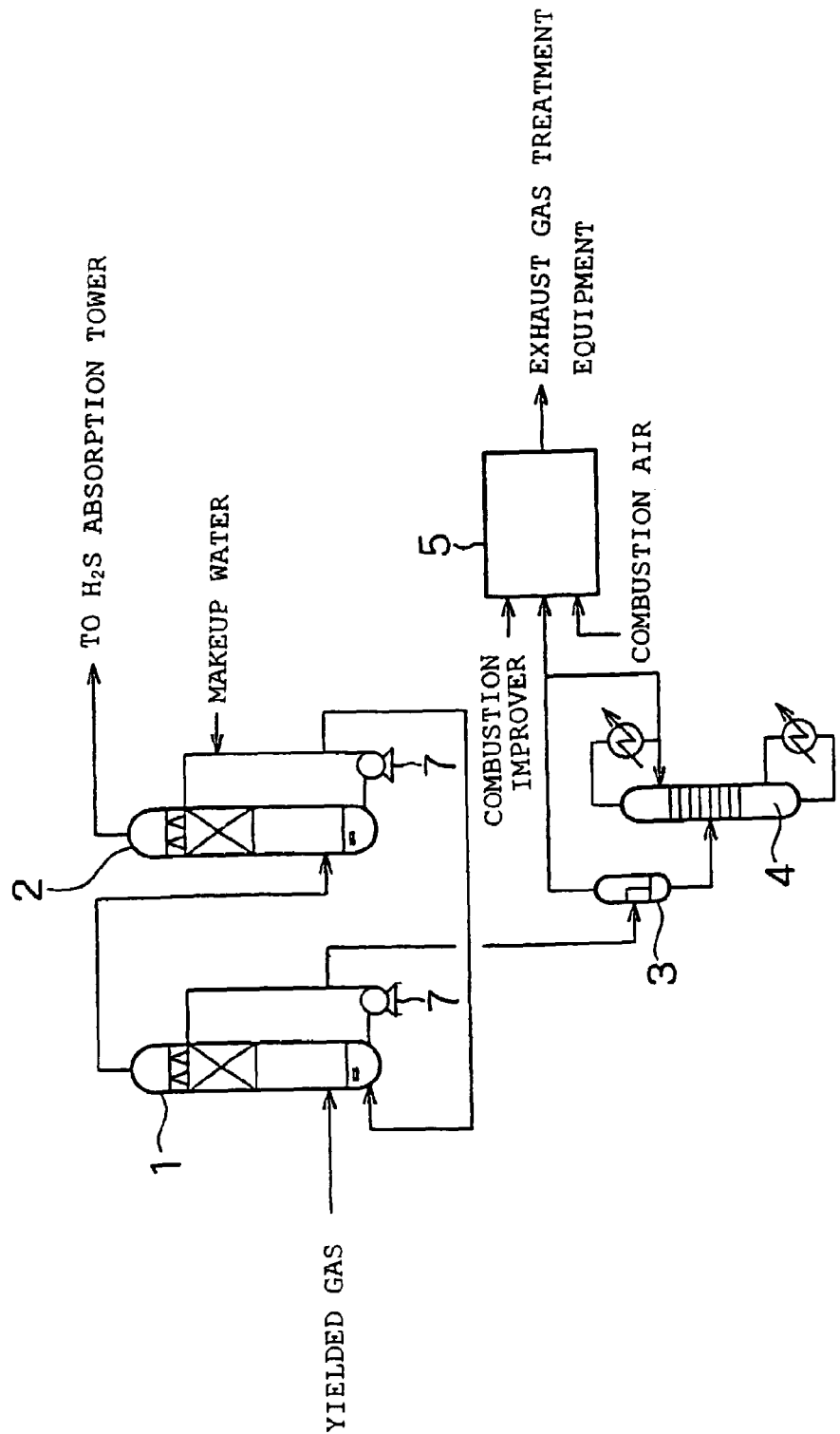
FIG. 1 is a schematic view showing the outline of a system suitable for a wet gas purification method in accordance with the present invention.

In the above figures, reference numeral 1 denotes a gas cooling tower, 2 denotes a gas cleaning tower, 3 denotes a flash drum, 4 denotes an ammonia stripper, 5 denotes an off-gas fired furnace, and 7 denotes a circulating pump.

DETAILED DESCRIPTION OF THE INVENTION

A specific embodiment of a wet gas purification method in accordance with the present invention will now be described with reference to the attached drawings.

FIG. 1 is a schematic view showing one example of a system suitable for a wet gas purification method in accordance with the present invention. In the system of the embodiment, a water-washing step may comprise a cooling step and a cleaning step. The cooling step may be performed by a gas cooling tower 1, and the cleaning step may be performed by a gas cleaning tower 2. Makeup water for absorbing ammonia components in a gas is continuously or intermittently charged into the gas cleaning tower 2. By these two water-washing towers, ammonia in the gas can be absorbed in an absorbent, and thereby removed. The amount of the makeup water to be charged is controlled so that the concentration of ammonia in the gas is 10 ppm or lower after the water-washing step. The gas discharged from the gas cleaning tower 2 is sent to a hydrogen sulfide absorption tower.

In the washing step of the embodiment, ammonia in the gas is removed by adding makeup water without adding sulfuric acid for adjusting the pH value. The washing step (carried in the water-washing tower) consists of two steps, which use two towers: gas cooling tower 1 and the gas cleaning tower 2. The makeup water charged into the gas cleaning tower 2 can be circulated by a pump 7 and acts as the absorbent for absorbing ammonia. The towers are coupled such that a part of the absorbent is sent into the gas cooling tower 1 provided upstream of the gas flow direction. A pump 7 circulates absorbent in the gas cooling tower 1 as well.

Conventionally, in the gas cooling tower 1, a step of adding sulfuric acid has been carried out. In the embodiment, makeup water is introduced into the gas cleaning tower 2 in place of sulfuric acid. Thereby, the concentration of ammonia in the absorbent in the whole of the washing step is decreased, and ammonia is removed. Specifically, when the concentration of ammonia in the absorbent becomes high, the absorbent tends to release ammonia due to partial pressure. Thus, it becomes difficult to remove ammonia using the absorbent in view of reaction equilibrium. Therefore, supplying makeup water continuously or intermittently can keep absorbent in a state of being able to absorb and remove ammonia.

Supplying makeup water in such a way allows the ammonia to react with carbon dioxide in the gas to dissolve in the absorbent as ammonium carbonate. Ammonia is more easily stripped in this state, since the pH value of the absorbent is high compared with when sulfuric acid is also present. Thus, ammonia and carbon dioxide can be taken out of the absorbent by raising the temperature of an ammonia stripper provided downstream of the water-washing towers without requiring the addition of caustic soda.

In the system the absorbent may be water ($H_2O$). The circulation of the absorbent in the water-washing towers by the operation of the system results in the increased concentration of ammonia in the absorbent. As described above, in the embodiment, a gas cooling tower 1 and gas cleaning tower 2 can be provided. By these two-towers, the concentration of ammonia can be made low at the outlet of the gas cooling tower 1. Thus, water containing less dissolved components can always be circulated in the gas cleaning tower 2, so that ammonia can be absorbed to be removed effectively.

However, the washing step need not necessarily be provided with two towers as in the embodiment. A water-washing tower consisting of one-tower can also be used. Inside of the one tower can be divided into two, and gas cooling and gas cleaning can be performed in the one tower. In the tower, liquids at the upper part and lower part which can be divided by a tray etc. are circulated separately.

The concentration of ammonia in the charged yielded gas is successively monitored, and an amount of makeup water best suitable for the amount of ammonia each time can be charged. The monitoring of the amount of ammonia can be performed, for example, by measuring the concentration thereof in the yielded gas just before the gas cooling tower 1.

On the other hand, ammonia in a gas, which is charged into a gas turbine must be reduced as much as possible because the ammonia is responsible for fuel NOx generation. In such case, the amount of charged makeup water should be controlled to reduce the concentration of ammonia to 10 ppm or lower. Therefore, it is usually preferable that the operation be performed by monitoring the concentration of ammonia in the gas near the outlet of the gas cleaning tower 2 at the later stage of water-washing step and by checking that the concentration of ammonia has a value not higher than a fixed value.

Absorbent is discharged from the water-washing step, some of which is usually drawn from the absorbent circulating in the gas cooling tower 1 and sent to the ammonia stripper 4 via a flash drum 3. In the stripper 4, ammonia is stripped from the absorbent. Then, the absorbent is divided into an off-gas containing ammonia and the remaining washing liquid. The ammonia stripper 4 is usually operated at about 80° C. at the upper stage and at about 130° C. at the lower stage.

Also, in this stripper 4, hydrogen sulfide components contained in the absorbent are also removed, and are contained in the off-gas together with ammonia. Therefore, the liquid after stripping does not contain hydrogen sulfide. Such an off-gas containing ammonia and a minute amount of hydrogen sulfide is sent into an off-gas fired furnace 5, whereby the ammonia and hydrogen sulfide are simultaneously burnt.

According to the above-described embodiment, the amount of effluent is increased by the charge of makeup water. Therefore, it is preferable that the effluent in the ammonia treating step be used by circulation as the makeup water charged in the washing step.

A system in which the water coming out of the stripper 4 is used again as makeup water is advantageous because the amount of water treated finally as effluent does not increase as in the conventional example. Also, the system is preferable in terms of the ease with which makeup water can be secured. Since the water discharged from the stripper 4 usually has a temperature increased to 100° C. or higher, the water may be supplied into the gas cleaning tower 2 as makeup water after being cooled.

The gas to be purified in the present invention may be any gas containing ammonia. Specifically, for example, the gas includes, but is not limited to, coal gasification gas containing much ammonia and hydrogen sulfide.

The gas purification method in accordance with the present invention can suitably used as a wet purification method for coal gasification gas at the preceding step of a hydrogen sulfide removing step as part of a system in which coal is gasified and used as power generation fuel. By the use of the above-described purification method in accordance with the present invention, purification can be performed very efficiently in the system for treating ammonia-containing gas.

According to the treating method in accordance with the present invention, since neither sulfuric acid nor caustic soda is used, the cost required for operation can be reduced significantly. Also, since ammonia is accumulated as $(NH_4)_2CO_3$, $NH_3$ and $CO_2$ are stripped by increasing the temperature without the use of NaOH, by which the cost required for operation can be reduced.

On the other hand, HCN components, which are other harmful components contained in the gas, cannot be absorbed and removed unless the absorbent has a high pH value. HCN components are scarcely removed by an absorbent having a pH value of about 5 to 6. In the conventional method in which sulfuric acid is added, the pH value of absorbent decreases (to about pH 5 to 6). By contrast, in the present invention, the pH value of absorbent in the water-washing towers increases (to about pH 6 to 9). Therefore, according to the purification method in accordance with the present invention, the HCN removing performance is improved by the increase in pH value of absorbent to about 6 to 9.

Also, according to the present invention, causes of material corrosion can be reduced by the increase in pH value of absorbent in the water-washing towers and the decrease in concentration of chlorine in the absorbent due to the addition of makeup water.

The experimental results showing the advantageous effects of the present invention will now be explained in detail as an example. However, the present invention is not limited by the example.

EXAMPLE 1

Figure 2:
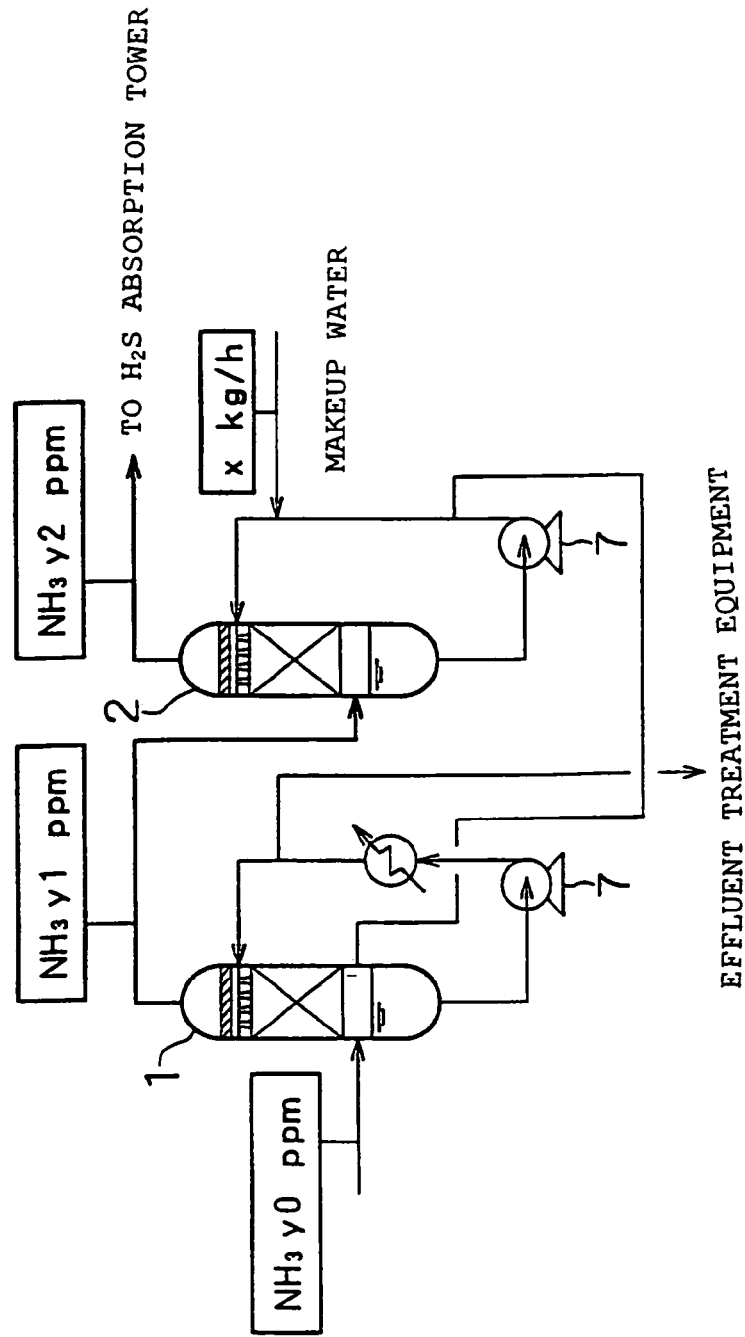
FIG. 2 is a schematic view showing a configuration of a purification system used in Example 1.

FIG. 2 shows the outline of a system in example 1.

Two towers are provided: the gas cooling tower 1 is provided upstream of the flow of gas, and the gas cleaning tower 2 is provided downstream of the flow of gas. From the inlet of the gas cooling tower 1, a yielded gas having an ammonia concentration (y0) of 1200 ppm was introduced at a gas flow rate of 3500 m$^3$N/h under a pressure of 0.9 MPa.

The amount (xkg/h) of makeup water charged into a circulation line of the gas cleaning tower 2 was changed continuously in the range of 40 to 350 kg/h.

Figure 3:
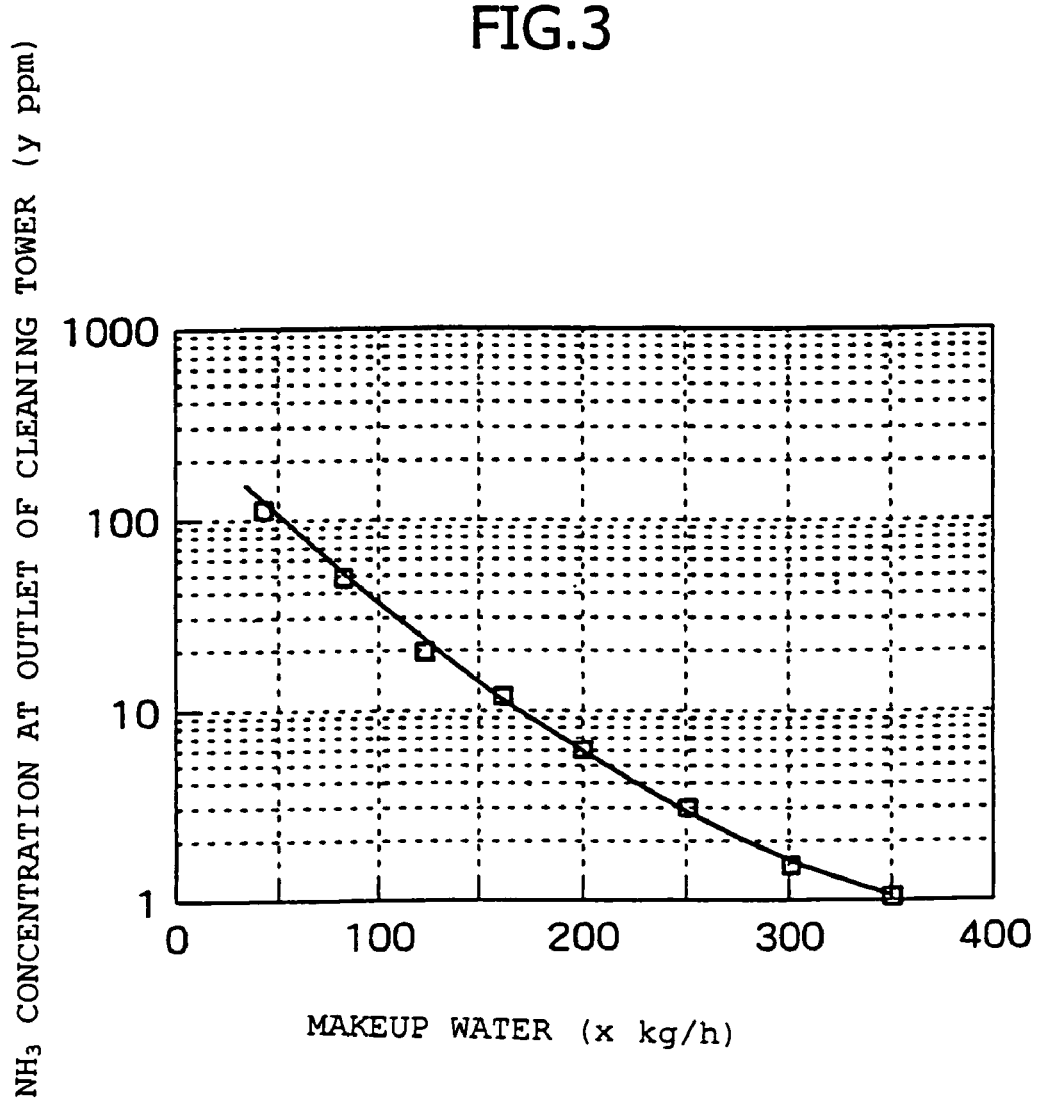
FIG. 3 is a graph in which the concentration of ammonia in a gas discharged from the outlet of a cleaning tower is plotted against the amount of makeup water.

When the temperatures of both of the gas cooling tower 1 and the gas cleaning tower 2 were set at 40° C., as shown in FIG. 3, the ammonia concentration (y2) measured at the outlet of the gas cleaning tower 2 decreased as the amount of makeup water increased. The amount of makeup water in this example indicates the amount in a preliminary plant. From the results, it was found out that if the amount of makeup water charged in the washing step is increased the concentration of ammonia in the yielded gas can be decreased very effectively.

The above is a description of the embodiment and example of the present invention. The embodiment and example are provided to aid in understanding the present invention, and do not limit the scope of the present invention.

The invention claimed is:

1. A wet gas purification method for removing ammonia from a coal or heavy oil gasification gas, the method comprising:
   a water-washing step comprising a gas cleaning step and a gas cooling step which is carried out upstream of the gas cleaning step in a gasification gas flow direction,
   wherein an amount of absorbent make-up water for absorbing ammonia is charged into the coal or heavy oil gasification gas in the gas cleaning step, part of the absorbent used in the gas cleaning step is sent to the gas cooling step such that ammonia is absorbed into the absorbent to be removed from the gasification gas in both the gas cooling and the gas cleaning step, and at least a portion of the absorbent make-up water is discharged from the washing step; and
   an ammonia treating step for stripping ammonia from the absorbent make-up water discharged after the water-washing step to separate the discharged absorbent make-up water into an off-gas containing ammonia and an effluent,
   wherein the amount of absorbent makeup water charged in the gas cleaning step is controlled so that the concentration of ammonia in the gasification gas after the gas cleaning step is 10 ppm or lower.

2. The wet gas purification method according to claim 1, further comprising a step of burning the off-gas after the ammonia treating step.

3. The wet gas purification method according to claim 1, wherein the effluent in the ammonia treating step is circulated to the washing step as absorbent make-up-water.

4. A wet gas purification system for removing ammonia from a coal or heavy oil gasification gas, the system comprising:
   water-washing towers comprising a gas cleaning tower with a gasification gas outlet and a gas cooling tower which is located upstream of the gas cleaning tower in a gasification gas flow direction,
   the gas cooling and the gas cleaning tower being coupled such that absorbent make-up water charged and used in the gas cleaning tower is sent to the gas cooling tower, allowing ammonia to be absorbed by the absorbent make-up water in both the gas cooling tower and the gas cleaning tower; and an ammonia stripper operatively connected to the gas cooling tower for receiving absorbent make-up water discharged from the gas cooling tower, the ammonia stripper being configured for stripping ammonia from absorbent discharged from the gas cleaning tower to separate the discharged absorbent make-up water into an off-gas containing ammonia and an effluent;

wherein the concentration of ammonia at the gasification gas outlet can be maintained at 10 ppm or lower by controlling the amount of absorbent make-up water charged in the gas cleaning tower.

5. The wet gas purification system according to claim 4, further comprising an off-gas fired furnace for burning off-gas downstream of the ammonia stripper.

6. The wet gas purification system according to claim 4, wherein the effluent from the ammonia stripper can be circulated to the water-washing towers as absorbent make-up water.

* * * * *